(12) United States Patent
Ashida et al.

(10) Patent No.: US 9,292,227 B2
(45) Date of Patent: Mar. 22, 2016

(54) METHOD FOR DIVISIONALLY MANAGING FILES ON A USER BASIS, AND A STORAGE SYSTEM AND COMPUTER PROGRAM PRODUCT THEREOF

(71) Applicant: International Business Machines Corporation, Armonk, NY (US)

(72) Inventors: Takashi Ashida, Tokyo (JP); Tohru Hasegawa, Tokyo (JP); Hiroshi Itagaki, Tokyo (JP); Shinsuke Mitsuma, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/098,361

(22) Filed: Dec. 5, 2013

(65) Prior Publication Data

US 2014/0181425 A1    Jun. 26, 2014

(30) Foreign Application Priority Data

Dec. 21, 2012  (JP) ................................. 2012-279169

(51) Int. Cl.
*G06F 12/00* (2006.01)
*G06F 3/06* (2006.01)

(52) U.S. Cl.
CPC ............ *G06F 3/0686* (2013.01); *G06F 3/0611* (2013.01); *G06F 3/0643* (2013.01); *G06F 3/0682* (2013.01)

(58) Field of Classification Search
None
See application file for complete search history.

(56) References Cited

U.S. PATENT DOCUMENTS

2011/0145199 A1*  6/2011  Prasad Palagummi ....... 707/654
2011/0238716 A1*  9/2011  Amir et al. .................... 707/823

FOREIGN PATENT DOCUMENTS

JP            10232800          9/1998

* cited by examiner

*Primary Examiner* — Duc Doan
(74) *Attorney, Agent, or Firm* — Zilka-Kotab, PC

(57) ABSTRACT

According to one embodiment, a method for a plurality of users to write at least one file to a medium in such a manner that the file is divisionally managed in a system environment in which an input/output control is performed on a storage system includes saving, in the medium as metadata, a user identifier (ID) for identifying a user and file attribute information about the file managed by a user associated with the user ID, and writing, as data, the file managed by the user to the medium as indicated by the file attribute information. In other embodiments, a writing program product, a reading program product, and a system are presented that allow a plurality of users to write at least one file to a medium in such a manner that the file is divisionally managed in a system environment.

20 Claims, 6 Drawing Sheets

| Access Rights / User File | Access by User A | Access by User B | Access by User C |
|---|---|---|---|
| File of User A | ~Owner(write) | ReadOnly | ReadOnly |
| File of User B | Invisible | ~Owner(write) | ReadOnly |
| File of User C | Invisible | Invisible | ~Owner(write) |

FIG. 5

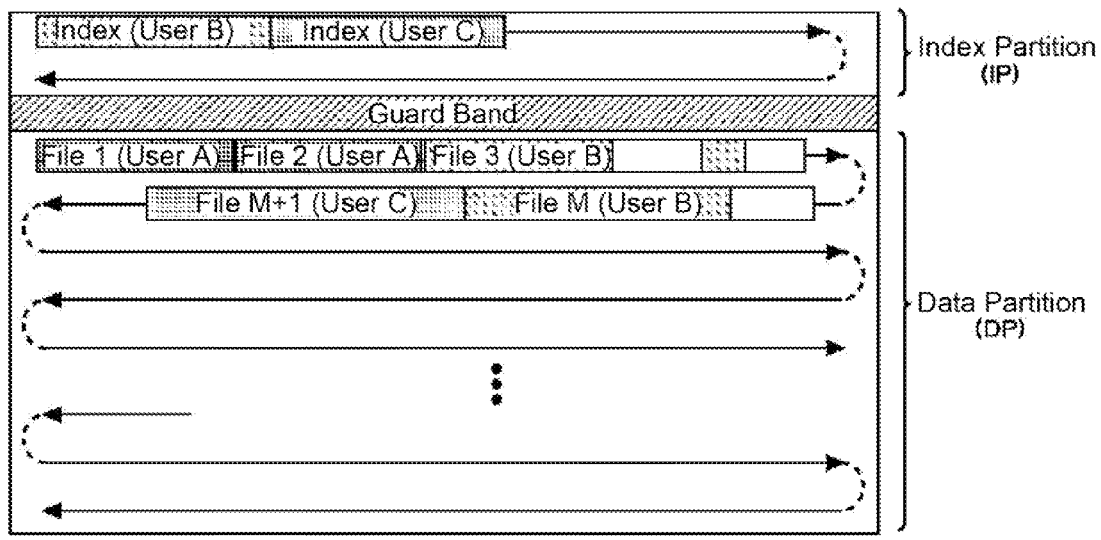
FIG. 6A
```
> dir
File 3
  : :
File N
  : :
File M
File M+1
```
FIG. 6B
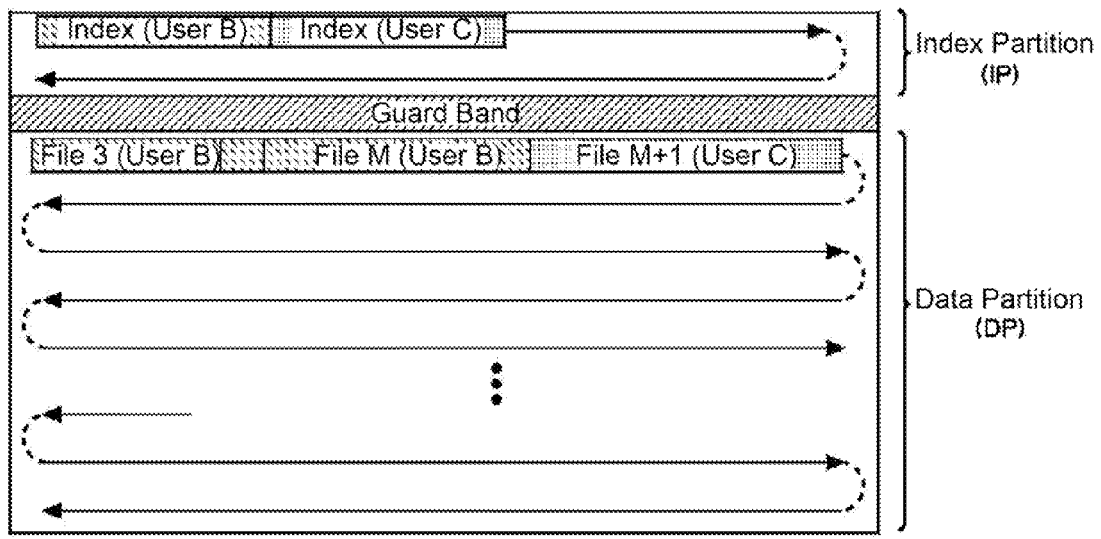
FIG. 6C

METHOD FOR DIVISIONALLY MANAGING FILES ON A USER BASIS, AND A STORAGE SYSTEM AND COMPUTER PROGRAM PRODUCT THEREOF

RELATED APPLICATIONS

The present application claims priority to Japanese Patent Application Serial No. 2012-279169, filed Dec. 21, 2012, which is herein incorporated by reference.

BACKGROUND

The present invention relates to data storage, and more specifically, the present invention relates to divisionally managing a file on a user basis in a file system in which data in a medium is handled as a file.

A file system is intended to control reading from and writing to a tape cartridge (medium) mounted in a tape storage apparatus (tape drive). The Linear Tape File System (LTFS) is a file system used in tape drives, which uses a magnetic tape medium housed in a tape cartridge as a removable data storage medium.

LTFS is responsible for controlling a tape library, which stores a plurality of tape media. With LTFS, an application does not have to have knowledge of the tape library, and a tape device may be more readily used than in conventional tape libraries operating under some other file system. Since magnetic tape has the characteristics of having a large capacity and low cost, a use case is possible in which a tape device is used as storage for a cloud system. In the case where LTFS is used in a cloud system including the tape library (as a storage system), it is desirable that a plurality of users manage access to the data on any one magnetic tape. However, in LTFS as used conventionally, files are managed with an index (metadata) with the assumption that a magnetic tape is allocated to one user only.

LTFS supports a plurality of operating systems, and therefore does not store information about who is the owner of each file in a magnetic tape itself. Therefore, it is difficult for a tape library running LTFS to manage access to the files in the magnetic tape on a user basis. In order to manage the files on a user basis, the files have to be systematically managed on the cloud side of the cloud system.

Japanese Patent Application No. JP10-232800A discloses a technique of dividing data itself, according to which data in one tape cartridge is divided into a plurality of tape cartridges, which may be used by a plurality of users. However, this reference does not disclose a system environment in which a plurality of users are allowed to share one medium, with each user having file attribute information for the files on the medium.

SUMMARY

According to one embodiment, a method for a plurality of users to write at least one file to a medium in such a manner that the file is divisionally managed in a system environment in which an input/output control is performed on a storage system includes saving, in the medium as metadata, a user identifier (ID) for identifying a user and file attribute information about the file managed by a user associated with the user ID, and writing, as data, the file managed by the user to the medium as indicated by the file attribute information.

In another embodiment, a writing program product configured for a plurality of users to write at least one file to a medium in such a manner that the file is divisionally managed in a system environment in which an input/output control is performed on a storage system is configured to cause a computer to perform saving, in the medium as metadata, a user ID for identifying a user and file attribute information about the file managed by a user associated with the user ID, and writing, as data, the file managed by the user to the medium as indicated by the file attribute information.

In yet another embodiment, a storage system configured to allow a plurality of users to write at least one file to a medium in such a manner that the file is divisionally managed in a system environment in which an input/output control is performed on the storage system, wherein a read/write control of the system is configured to perform saving, in the medium as metadata, a user ID for identifying a user and file attribute information about the file managed by a user associated with the user ID, and writing, as data, the file managed by the user to the medium as indicated by the file attribute information.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 5 is a table showing access rights information about accesses from each user to files of other users.

FIGS. 6A-6C show contents of an index partition (IP) and a data partition (DP) of a medium after medium migration to a medium for only registered users when a particular user is deregistered.

DETAILED DESCRIPTION

Figure 1:
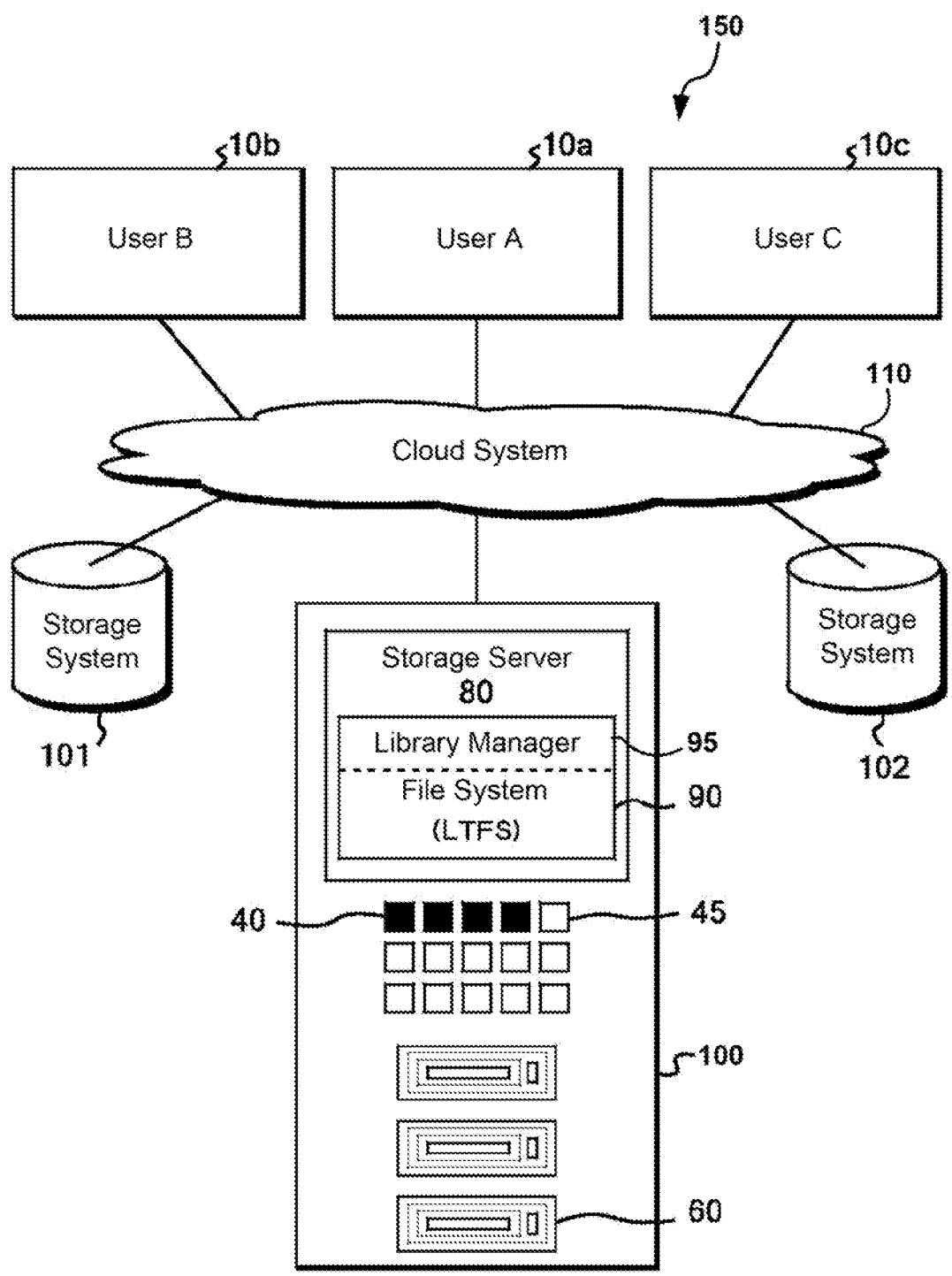
FIG. 1 shows a cloud system including a tape library according to one embodiment.

In view of the circumstances described previously, in one embodiment, a method is described for writing a file to a plurality of media that reduces the time required for loading and/or unloading that occurs in reading of a plurality of media. Furthermore, a storage system that employs this method is also described according to more embodiments.

According to one general embodiment, a method for a plurality of users to write at least one file to a medium in such a manner that the file is divisionally managed in a system environment in which an input/output control is performed on a storage system includes saving, in the medium as metadata, a user identifier (ID) for identifying a user and file attribute information about the file managed by a user associated with the user ID, and writing, as data, the file managed by the user to the medium as indicated by the file attribute information.

In another general embodiment, a writing program product configured for a plurality of users to write at least one file to a medium in such a manner that the file is divisionally managed in a system environment in which an input/output control is performed on a storage system is configured to cause a computer to perform saving, in the medium as metadata, a user ID for identifying a user and file attribute information about the file managed by a user associated with the user ID, and writing, as data, the file managed by the user to the medium as indicated by the file attribute information.

In yet another general embodiment, a storage system configured to allow a plurality of users to write at least one file to a medium in such a manner that the file is divisionally managed in a system environment in which an input/output control is performed on the storage system, wherein a read/write control of the system is configured to perform saving, in the medium as metadata, a user ID for identifying a user and file attribute information about the file managed by a user associated with the user ID, and writing, as data, the file managed by the user to the medium as indicated by the file attribute information.

In one embodiment, a method is described for a plurality of users, to which a system environment allocates IDs, to write at least one file to one medium (tape medium) in such a manner that the file may be divisionally managed in a system environment in which an input/output control is performed on a storage system. In this embodiment, the writing method comprises: (1) saving, in the medium as metadata, a user ID for identifying a user and file attribute information about the file managed by the user associated with the user ID; and (2) writing, as data, the file managed by the user to the medium as indicated by the file attribute information.

In the writing method, the medium is divided into two or more partitions so as to enable reading and writing by a file system for the tape drive, the partitions include an index partition (IP) in which the metadata is saved and a data partition (DP) in which data of the file is saved. The metadata saved in the index partition includes the user ID for identifying the user and the file attribute information associated with the user ID, and the file attribute information includes a file name, a data location in the medium, and a size.

The writing method is characterized in that the user ID for identifying the user is identified (specified) in the system environment in which the input/output control is performed.

The writing method, in some embodiments, may further comprise: (3) saving, in the medium as metadata, user access rights information about access to a file managed by each user from any other users, and the user access rights information is identified (specified) in the system environment and saved in the index partition as metadata.

According to another embodiment, a medium may be provided to which a file is written by a plurality of users according to the writing method.

In another embodiment, a method is described for each of the users to read a file written to a medium according to the previously described writing method in a system environment in which an input/output control is performed on a storage system (the medium being mounted in a drive of the storage system). In this embodiment, the reading method comprises: (1) reading metadata from the medium; (2) extracting file attribute information associated with a user ID that indicates a user from the metadata; and (3) reading a relevant file based on the file attribute information associated with the user ID.

In another embodiment, a writing program product (file system) is described for a plurality of users (to which a system environment allocates user IDs) to write at least one file to one medium in such a manner that the file is divisionally managed in a system environment in which an input/output control is performed on a storage system. In this embodiment, the writing program product makes a computer (and/or processor) perform: (1) saving, in the medium as metadata, a user ID for identifying a user and file attribute information about a file managed by the user associated with the user ID; and (2) writing, as data, the file managed by the user to the medium as indicated by the file attribute information.

In yet another embodiment, a program product (file system) is described for each of the users to read a file written to a medium according to the writing program product described previously in a system environment in which an input/output control is performed on a storage system (the medium being mounted in a drive of the storage system). In this embodiment, the reading program product makes a computer (and/or processor) perform: (1) reading metadata from the medium; (2) extracting file attribute information associated with a user ID that indicates the user from the metadata; and (3) reading a relevant file based on the file attribute information associated with the user ID.

In even another embodiment, a storage system is described which allows a plurality of users (to which a system environment allocates user IDs) to write at least one file to one medium in such a manner that the file is divisionally managed in a system environment in which an input/output control is performed on the storage system. A read/write control of the system is configured for: (1) saving, in the medium as metadata, a user ID for identifying a user and file attribute information about the file managed by the user associated with the user ID; and (2) writing, as data, the file managed by the user to the medium as indicated by the file attribute information.

In a further embodiment, a storage system allows each of the users to read a file written to a medium (mounted in a drive of the storage system) in a system environment in which an input/output control is performed on the storage system. A read/write control of the system is configured for: (1) reading metadata from the mounted medium; (2) extracting file attribute information associated with a user ID that indicates the user from the metadata; and (3) reading a relevant file based on the file attribute information associated with the user ID.

The storage systems described above facilitate management of access to a file on one medium from a plurality of users, according to the various embodiments described.

An exemplary embodiment is described below with regard to how a plurality of users save files in a tape library and how a tape may be partitioned into two partitions. In the exemplary embodiment, management of index partitions distinguished on a "user" basis are described, but other types of index partitions may be used.

Linear Tape File System (LTFS), as a state-of-the-art file system for a tape drive, is configured to manage files by allocating, as an index, attribute information about a plurality of files of one user to one tape. According to the exemplary embodiment, a mechanism to manage one user with one index is introduced to the file system. File attributes for a plurality of users are distinguished and included in an index partition of one tape medium. Data of the files are saved in a data partition. This technique allows for one medium to hold a plurality of file system instances. According to the exemplary embodiment, by allocating an index to each user, the file system appears to allow each user to exclusively occupy one medium.

FIG. 1 shows a system 150 comprising a cloud system 110 and a tape library 100, according to one embodiment. A storage system (e.g., tape library) 100 includes three (or more or less) tape drives 60, a plurality of media (e.g., tape cartridges) 40, and a plurality of storage slots 45 configured to house the tape cartridges 40. The storage system 100 has a large number of tape cartridges 40 housed in the slots 45. The storage system 100 forms a cloud system with one or more other storage systems 101 and 102 (which may be tape libraries or some other type of storage system) and provides service (data writing and reading) to users A, B, and C. The three users (which may be applications, modules, actual users, etc.) A, B, and C access the tape cartridges 40 through a file system 90 of the tape drive 60.

The users A, B, and C of hosts (which may be servers, mainframes, systems, etc.) 10a, 10b, and 10c issue a command, such as a small computer system interface (SCSI) command for example, to a drive 60 in which a tape cartridge 40 is mounted via a file system 90. A storage server 80 in the storage system 100 is configured to receive an access request. The storage server 80 centrally manages the plurality of drives 60 and the plurality of tape cartridges 40 in concert with the library manager 95. The library manager 95 virtualizes the hardware resources and controls reading and writing through the file system 90.

The tape drive 60 is configured to perform data reading from and data writing to the tape medium (a tape cartridge 40) in units of data sets (DS) having a fixed length formed by a plurality of pieces of data transmitted from the host 10. A typical size of a DS is 4 MB, but more or less data may be stored in each DS, such as 1 MB, 2 MB, 6 MB, 8 MB, etc. The user A (application) of the host 10a transmits a write/read request in the form of a record having a variable length to a tape drive 60 through the file system 90. When the communications standard used in SCSI, the host 10a issues a data write/read request to the tape drive 60. For other communications standards, the flow of information may be altered to fit specific requirement of the communications standard, as would be understood by one of skill in the art.

After the command is received from the host 10a, the tape drive 60 writes data to the tape medium or reads data from the tape medium. The tape drive 60 includes a buffer, a read/write channel, a head, a motor, a reel around which the tape medium is wound, a read/write control, a head position controlling system, and a motor driver, in one embodiment. A tape cartridge 40 is removably mounted in the tape drive 60. The tape runs in the longitudinal direction as the reel rotates. The head is used to write data to the tape and read data from the tape as the tape runs in the longitudinal direction. The tape cartridge 40 is provided with a non-contact nonvolatile memory referred to as a cartridge memory (CM). The tape drive 60 conducts writing to and reading from the CM mounted in the tape cartridge 40 in a non-contact manner. The CM stores one or more cartridge attributes, such as name, serial number, data storage size, etc. The tape drive 60 may optimally conduct reading and writing by retrieving the one or more cartridge attributes from the CM.

Figure 2:
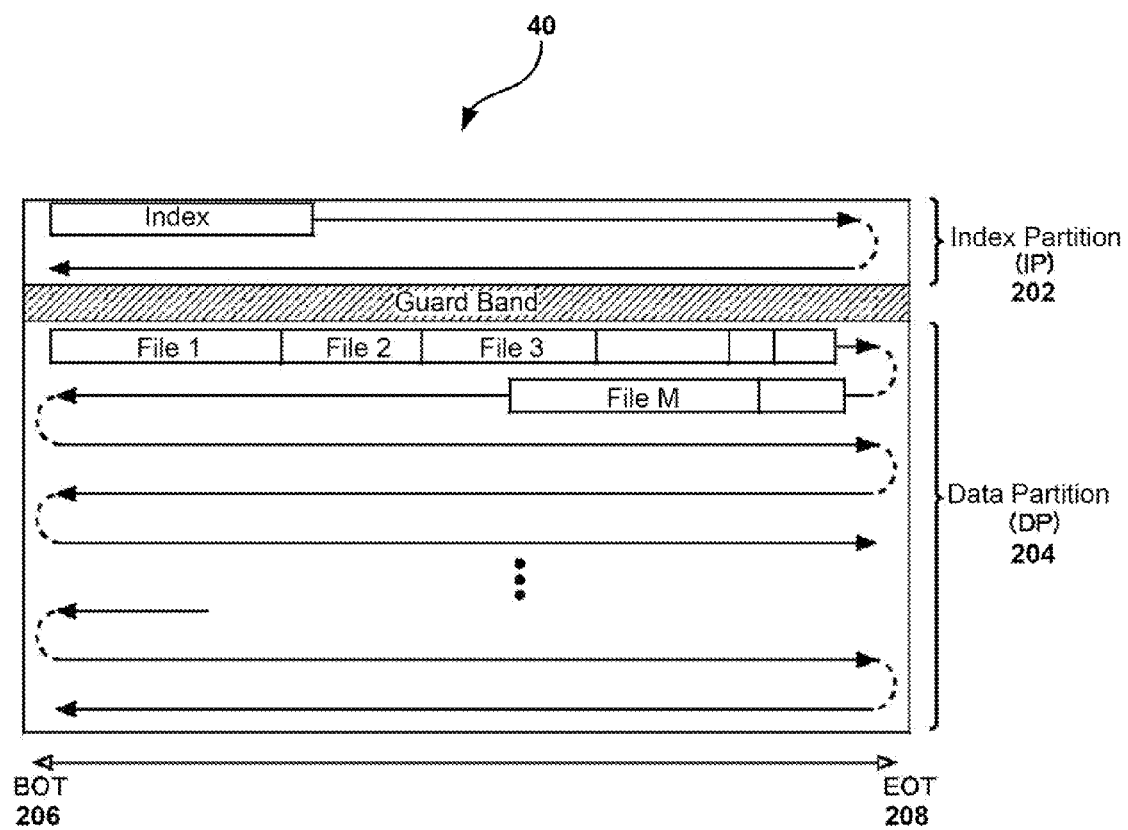
FIG. 2 shows a tape medium of one tape cartridge being divided into an index partition and a data partition, according to one embodiment.

FIG. 2 shows that the tape medium in one tape cartridge 40 may be divided into the index partition 202 and the data partition 204. FIG. 2 shows an exemplary configuration of a tape medium in conformity with the Linear Tape Open 5 (LTO5) standard. In this exemplary configuration, the tape medium is divided into two partitions, the index partition (IP) 202 and the data partition (DP) 204, extending from the beginning of the tape (BOT) 206 to the end of the tape (EOT) 208. Along the data recording track, the medium is divided into the leading index partition and the following data partition that occupies most of the storage area of the tape. The index partition and the data partition of the medium are separated by a guard band region. Depending on the specifications, any number of partitions, such as three or more, may be provided. In the case where LTFS is used for file management, the tape medium used for the Enterprise Tape Drive TS1140 available from IBM Corp. is the same as the tape medium conforming to the LTO5 in that the tape medium is generally divided into two partitions.

The file system enables the tape drive to handle data on a file basis. For example, the LTFS may make data written to a medium appear as a file.

The file system enables the tape drive to handle each partition like one tape and selectively write data to each partition. The LTFS retains attribute information about a file (file name, location in the medium, size, or the like) as metadata in the index partition. If one file is modified or otherwise divided into a plurality of parts, the file is expressed by a plurality of components as metadata.

More specifically, an index indicating various kinds of attribute information is stored in the index partition. The file system (e.g., LTFS) that always reads only metadata including the attribute information about the latest file part from the index partition, which is located at the beginning of the tape medium, enables quick access to the file written to the data partition. The metadata in the index partition of the tape medium is read when the tape cartridge is mounted in the drive. The metadata is overwritten with new information when the tape cartridge is unmounted from the drive.

Figure 3A:
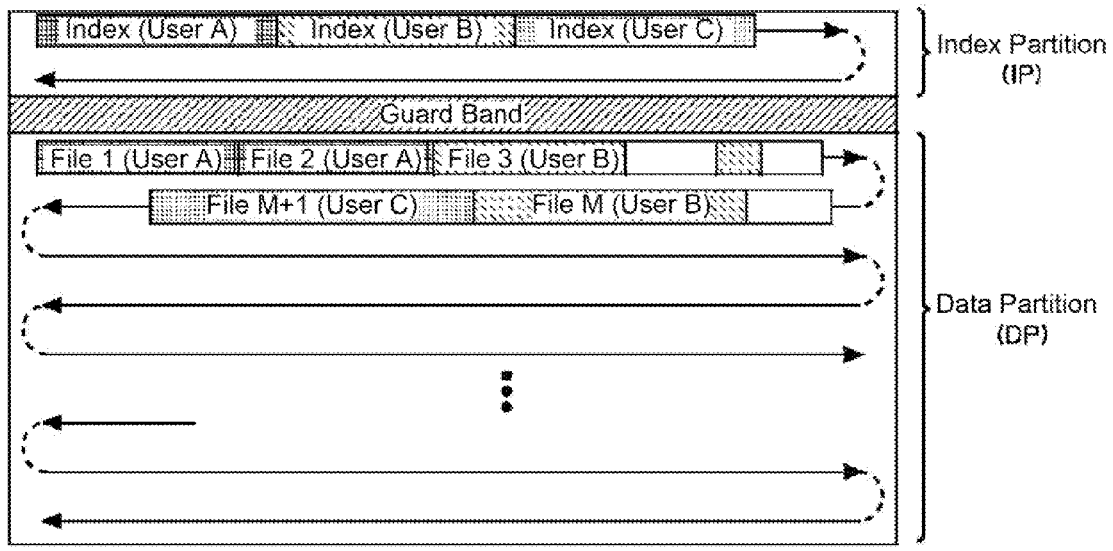
FIGS. 3A-3B show a relationship between indexes (metadata) and files/data according to one embodiment where a plurality of users share one tape.
Figure 3B:
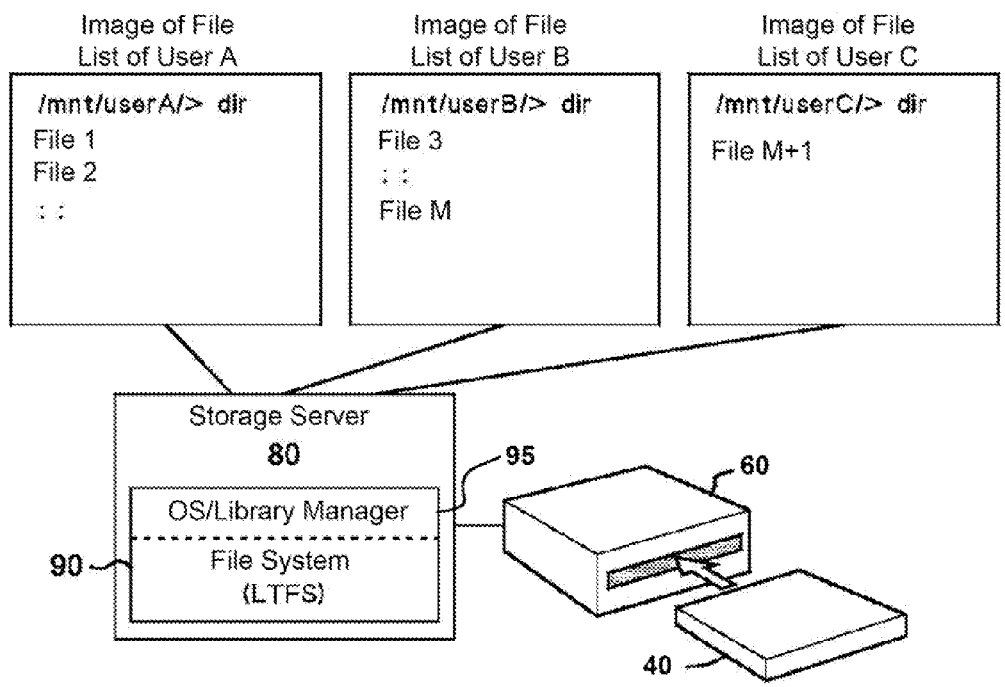

FIGS. 3A-3B show a relationship between indexes (metadata) and files according to one embodiment when a plurality of users share one tape. FIG. 3A shows an example in which metadata for each of a plurality of users is separately saved in the index partition and a plurality of files of each user are written. According to one embodiment, one medium holds instances of a plurality of users, e.g., user ID and file attribute information (file name, data location and size). Indexes of the users A, B, and C are saved in the IP of the medium. The indexes include file information identified and distinguished by the user IDs of the respective users A, B, and C. Data of files of the users A, B, and C, which are identified by the file attributes (file name, data location, size, etc.) saved in the IP, are written to the DP of the medium. FIG. 3A shows that File 1 and File 2 of the user A, File 3, ..., File M of the user B, and File M+1 of the user C are recorded in the DP of the medium, for example.

FIG. 3B shows how the file names of the files of the users managed appear in the case where access management of the medium shown in FIG. 3A is configured on the system side according to this approach. Referring again to FIG. 3B, each user A, B, and C accesses one tape cartridge 40 through the file system 90 responsible for access control on the storage server 80 in his/her own system environment. One medium shown in FIG. 3A contains a plurality of Files 1, 2, 3, ..., M, M+1, and so on, written by the three users A, B, and C.

FIG. 3B shows how the file names are displayed on the screens of the users A, B, and C based on the acquired metadata when the users access the medium in their own system environments, in accordance with one embodiment. When the user A, B, or C activates its own system, the LTFS identifies the user ID and acquires the index (metadata) corresponding to the user ID from the IP, in this approach. For example, if the user A accesses the medium in which a file thereof is saved, the file system acquires the user ID to register the user ID of the user A. The file system extracts the index that agrees with the user ID acquired from the system environment and produces a screen display of a file list in the system environment of the user A. The file names of the files managed by the users B and C are also displayed on their respective screens in the same mechanism as that for the user A. In the case where the file names of the users A, B, and C are displayed on the screens running on Linux, it is effective to set different mount points for different users.

Figure 4:
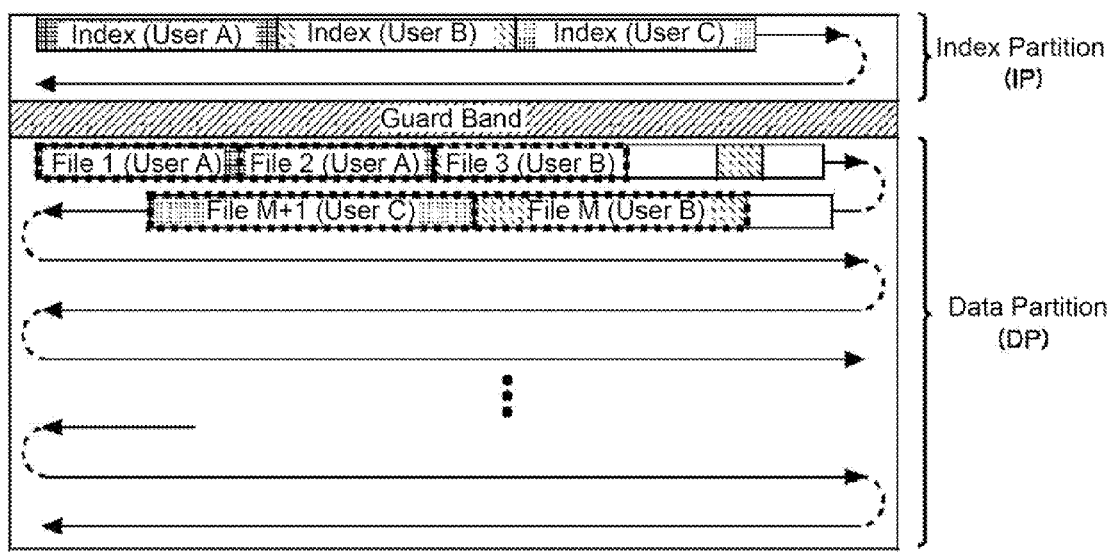
FIG. 4 shows metadata saved in an index partition of a medium and files written to a data partition where a particular user is registered with a cloud system, according to one embodiment.

FIG. 4 shows indexes saved in the index partition of the medium and file data written to the data partition when a particular user C is registered with the cloud system, according to one exemplary embodiment. The indexes in the medium shown in FIG. 4 are those in the case where a file of the user C is saved in the medium in addition to the existing files of the users A and B. Metadata about the file of the user C is saved in the index partition in addition to the metadata about the users A and B. The metadata includes the file attribute information (file name, data location, and size, etc.) associated with the user ID.

More specifically, the indexes of the users A, B, and C may be saved in the index partition (the file attribute information linked with the user ID is saved). The files of the users A, B, and C are written to the data partitions indicated by the file attribute information (file name, data location, and size, etc.) in this approach. As is shown, the attribute information about the file of the user C is appended to the IP of the medium in this exemplary embodiment. A file M+1 is written to the DP as indicated by the index of the user C. The files of the users A, B, and C are written to the data partition of one medium. The file names of the files of the user A are Files 1 and 2. The file names of the files of the user B are File 3, . . . , and File M. File M+1 of the user C is appended to the end of the data partition.

A master index, or the like, that indicates organization information about the users may be disposed in a leading area of the index partition in one embodiment. The master index describes the user ID of each of the users A, B, and C and the location (e.g., block number) of the file index for each user (the metadata including the file attribute information) in a file part thereof.

The file system performs management in such a manner that the user IDs of the users stored in the IP of the medium agree with the user IDs in the system environment that administers the LTFS. The file system extracts the file attribute information for the user IDs that agree from the medium, and reads the files associated with the user IDs. The system environment is set for each of the users A, B, and C and manages the storage system and file input/output based on the file system. For example, the ID of each user is allocated as an ID that is identified by the system environment, such as an OS account or an application system.

A method of registering a user ID for identifying a user with a system environment in which the LTFS is used for file input/output to/from a medium is a method of identifying the user ID to the system environment, in accordance with one embodiment. The user ID of the user registered with the cloud system may be embedded in an index file of the user written to the medium.

FIG. 5 is a table showing access rights of each user to files of the other users (user access rights information table), according to one embodiment. When the users A, B, and C access files, access rights to the files of the other users are assigned to each user. The LTFS keeps track of the file access right of each user and controls an access to each file based on the access rights information. For example, the table shown in FIG. 5 is an example of the table showing how an access to a file of each user by the other users is controlled, in which the columns show which user accesses, and the rows show which file is accessed, in accordance with one exemplary embodiment.

The files of the user A on the index file of the user A may be referred to by the other users with an attribute "ReadOnly." For example, if the OS is Linux, all the files of the user A may have permission flag 644 and are managed by the LTFS.

The user A is not informed of the presence of the files of the user B on the index file of the user B, but the files of the user B on the index file of the user B may be referred to by the user C with an attribute "ReadOnly." For example, if the OS is Linux, the users B and C are defined as the same user group, for example, and all the files of the user B have permission flag 640 and are managed by the LTFS.

The files of the user C on the index file of the user C are designated as private files, and the other users are not informed of the presence of the files of the user C on the index file of the user C. For example, if the OS is Linux, all the files of the user A have permission flag 600 and are managed by the LTFS.

In the actual access management in the LTFS, a file permission capability of the OS may be used. For more complicated control, a specific access management logic may be implemented in the LTFS. By configuring the LTFS so as to make the same setting for all the files in the user index rather than to make a setting for each individual file, the LTFS may perform access management of the other users.

FIG. 6A shows contents of the IP and the DP of the medium, FIG. 6B shows how the files appear at the system administrator level, and FIG. 6C shows the contents of the IP and the DP after medium migration to a medium only for the files of the registered users. These figures represent a situation where a user is deregistered.

FIG. 6A shows the contents of the IP and the DP of the medium when the user A is deregistered in accordance with one exemplary embodiment.

When a user is deregistered, the index of the user is invalidated. The files of the deregistered user no longer are displayed on the system. If the user A is deregistered, the index of the user A is invalidated. The invalidation may be achieved by giving an attribute to the index so that the LTFS may determine whether to delete the index of the deregistered user or not. The files having been owned by the user A may be made so as to no longer exist in the file system.

FIG. 6B shows how all the files appear at the system administrator level (file list at the system administrator level) when the user A is deregistered. Even when the index of the user A is deleted, the files of the user A remain in the tape. Since the index of the user A does not exist in the IP, the plurality of Files 1 and 2 of the user A remain in the DP. However, the LTFS cannot access any file that is not associated with an index. Therefore, when the medium is a tape, in order to reuse the file areas for the files of the user A, required data is copied into another tape, and the original tape is then reused.

FIG. 6C shows the contents of the IP and the DP after medium migration to a medium for only the Files 3, M, and M+1 of the registered users B and C when the user A is deregistered. The LTFS may migrate data by copying the listed files of the users B and C existing in the index into another tape or medium. By the migration, the files on the medium may be resorted on a user basis, and the capacity of the medium may be more efficiently used.

A technique is provided that is effective not only for access management but also for data migration for reasons of the functionality of the LTFS described below. For example, the data of the deregistered user is unnecessary, and the tape area having been occupied by the data may be reused, when desired. However, the data in the middle of the tape cannot be rewritten for reasons relating to the nature of tape medium. Thus, the required data alone is copied into another tape in order to reuse the original tape, in one approach. According to one embodiment, any unnecessary user file may be concealed, so that the migration may be completed by copying all the files that exist (that are visible on the system) into another tape.

The list of the files managed by each user is displayed on a screen or display with a different mount point. When this technique is used in practice in the cloud system under Linux, it is effective to use a different mount point for each user as shown in the following screen display form.

/mnt/userA/<tree structure of data of user A written to tape>

/mnt/userB/<tree structure of data of user B written to tape>

/mnt/userC/<tree structure of data of user C written to tape>

A different mount point is set for each user when the LTFS is activated. The mount point is set when the LTFS is activated or when the target user logs in to the system, such as a cloud system, after the LTFS is activated. Under Linux, the mount point indicates a folder below a leading part of the pass. To each user, the LTFS shows the files below the mount point. The LTFS acquires the meta information or metadata for each user and manages the meta information as if the meta information exists below the corresponding mount point. If the user IDs are "UserA" and "UserB," a mount point "/mnt/UserA" is allocated to the user A, and a mount point "/mnt/UserB" is allocated to the user B. The files of each user are arranged to appear below the pass.

Based on the access rights information, the LTFS manages treatment of the files shown below the mount point "/mnt/UserA" with respect to the other users. Accessing among the users may be controlled by mount point sharing access control. For more complicated control, a specific mechanism may be implemented in the LTFS. This approach has an advantage that different users may create files having the same name containing the file pass written to the tape.

(1) A different mount point is set for each user when the LTFS is activated according to one embodiment. The mount point is set when the LTFS is activated or when the target user logs in to the system, such as a cloud system, after the LTFS is activated. Under Linux, the mount point indicates a folder below a leading part of a pass.

(2) To each user, the LTFS shows the files below the mount point. The LTFS acquires the meta information for each user and manages the meta information as if the meta information exists below the corresponding mount point. If the user IDs are "UserA" and "UserB," for example, a mount point "/mnt/UserA" may be allocated to the user A, and a mount point "/mnt/UserB" may be allocated to the user B. The files of each user are arranged to appear below the pass.

(3) Based on the access rights information, the LTFS manages treatment of the files shown below the mount point "/mnt/UserA" with respect to the other users according to one embodiment.

The present invention is not limited to an implementation in which files are distinguished on a "user" basis. Provided that a parameter for managing operations of various kinds of computers is referred to by a general term "category," the present invention includes an implementation in which files are distinguished by categories, such as "user," "location," "time," etc. The scope of the present invention includes identifying and managing a plurality of files saved in one medium by various kinds of categories.

In the storage system to which the exemplary example described above is applied, an index is allocated to each user, thereby facilitating management of access to data in a medium on a user basis. By using the present invention, the same management scheme may be provided on different platforms independently of the OS or application. Furthermore, the present invention allows the files of each user to be managed in such a manner that the other users are unaware of the presence of the files and therefore is effective in a cloud environment designed for a plurality of users. Although the present invention has been described with regard to an exemplary embodiment, the scope of the present invention is not limited to the exemplary embodiment described above. As is obvious to those skilled in the art, various modifications may be made and various alternatives may be adopted without departing from the spirit and scope of the present invention.

What is claimed is:

1. A method for a plurality of users to write at least one file to a medium in such a manner that the at least one file is divisionally managed in a system environment in which an input/output control is performed on a storage system, the method comprising:
   presenting the medium to each of the plurality of users as being exclusively occupied by whichever user attempts to access the at least one file from the medium;
   writing, as data to a data partition of the medium, a first file managed by a first user as indicated by first file attribute information; and
   saving, to a first user-specific index in an index partition of the medium as metadata, a first user identifier (ID) for identifying the first user and the first file attribute information about the first file managed by the first user associated with the first user ID.

2. The method as recited in claim 1, wherein the medium is divided into two or more partitions, wherein the partitions include the index partition configured to store a plurality of user-specific indexes and the data partition in which data is stored, and wherein the first file attribute information includes a file name of the first file, a data location for the first file in the medium, and a size of the first file.

3. The method as recited in claim 1, further comprising:
   writing, as data to the data partition of the medium, a second file managed by a second user as indicated by second file attribute information; and
   saving, to a second user-specific index in the index partition of the medium as metadata, a second user ID for identifying the second user and the second file attribute information about the second file managed by the second user associated with the second user ID.

4. The medium to which the at least one file is written by the plurality of users according to the method as recited in claim 2.

5. The method as recited in claim 1, wherein the first user ID for identifying the first user is identified in the system environment in which the input/output control is performed.

6. The method as recited in claim 3, further comprising:
   saving, in the medium as metadata, user access rights information for other users of the plurality of users to access any files managed by each of the plurality of users, wherein the user access rights information is identified in the system environment and saved in the index partition as metadata.

7. The medium to which the at least one file is written by the plurality of users according to the method as recited in claim 1.

8. The method as recited in claim 7, comprising:
   reading the metadata from the medium in response to a request from the first user to access the first file;
   extracting, from the metadata, the first file attribute information associated with the first user ID that indicates the first user; and reading the first file from the data partition of the medium based on the first file attribute information associated with the first user ID.

9. The method as recited in claim 6, comprising:
reading the metadata from the medium in response to receiving a request from the second user to access the first file;
extracting, from the metadata, the first file attribute information and the user access rights information relating to the first file;
determining whether the second user has read access rights to the first file; and
reading the first file from the data partition of the medium, based on the first file attribute information, in response to a determination that the second user has read access rights to the first file.

10. The method as recited in claim 9, wherein the second user ID for identifying the second user is identified in the system environment in which the input/output control is performed.

11. A computer program product configured for a plurality of users to write at least one file to a first medium in such a manner that the at least one file is divisionally managed in a system environment in which an input/output control is performed on a storage system, the computer program product comprising a computer readable storage medium having program code embodied therewith, wherein the embodied program code being configured to cause a computer to perform:
presenting the medium to each of the plurality of users as being exclusively occupied by whichever user attempts to access the at least one file from the first medium;
writing, as data to a data partition of the first medium, a first file managed by a first user as indicated by first file attribute information; and
saving, to a first user-specific index in an index partition of the first medium as metadata, a first user identifier (ID) for identifying the first user and the first file attribute information about the first file managed by the first user associated with the first user ID.

12. The computer program product as recited in claim 11, wherein the first medium is divided into two or more partitions, wherein the partitions include the index partition configured to store a plurality of user-specific indexes and the data partition in which data is stored, and wherein the first file attribute information includes a file name of the first file, a data location for the first file in the first medium, and a size of the first file.

13. The computer program product as recited in claim 12, wherein the program code is further configured to cause the computer to perform:
writing, as data to the data partition of the first medium, a second file managed by a second user as indicated by second file attribute information; and
saving, to a second user-specific index in the index partition of the first medium as metadata, a second user ID for identifying the second user and the second file attribute information about the second file managed by the second user associated with the second user ID.

14. The computer program product as recited in claim 11, wherein the program code is further configured to cause the computer to perform:
reading the metadata from the first medium in response to receiving a request from the first user to access the first file;
extracting, from the metadata, the first file attribute information associated with the first user ID that indicates the first user; and reading the first file from the data partition of the medium based on the first file attribute information associated with the first user ID.

15. A storage system configured to allow a plurality of users to write at least one file to a medium in such a manner that the at least one file is divisionally managed in a system environment in which an input/output control is performed on the storage system, wherein a read/write control of the system is configured to perform:
presenting the medium to each of the plurality of users as being exclusively occupied by whichever user attempts to access the at least one file from the medium;
writing, as data to a data partition of the medium, a first file managed by a first user as indicated by first file attribute information; and
saving, to a first user-specific index in an index partition of the medium as metadata, a first user identifier (ID) for identifying the first user and the first file attribute information about the first file managed by the first user associated with the first user ID.

16. The storage system as recited in claim 15, wherein the medium is divided into two or more partitions, wherein the partitions include the index partition configured to store a plurality of user-specific indexes and the data partition in which data is stored, and wherein the first file attribute information includes a file name of the first file, a data location for the first file in the medium, and a size of the first file.

17. The storage system as recited in claim 16, wherein the first user ID for identifying the first user is identified in the system environment in which the input/output control is performed.

18. The storage system as recited in claim 15, wherein the read/write control of the system is further configured to perform:
reading the metadata from the medium in response to a request from the first user to access the first file;
extracting, from the metadata, the first file attribute information associated with the first user ID that indicates the first user from the metadata; and
reading the first file from the data partition of the medium based on the first file attribute information associated with the first user ID.

19. The storage system as recited in claim 15, wherein the read/write control of the system is further configured to perform:
writing, as data to the data partition of the medium, a second file managed by a second user as indicated by second file attribute information; and
saving, to a second user-specific index in the index partition of the medium as metadata, a second user ID for identifying the second user and the second file attribute information about the second file managed by the second user associated with the second user ID.

20. The storage system as recited in claim 19, wherein the read/write control of the system is further configured to perform:
reading the metadata from the medium in response to receiving a request from the first user to access the second file;
extracting, from the metadata, user access rights information relating to the second file, the user access rights information dictating which users of the plurality of users is allowed access to files managed by any of the plurality of users;
determining whether the first user has read access rights to the second file; and reading the second file from the data partition of the medium, based on the second file attribute information, in response to a determination that the first user has read access rights to the second file.

\* \* \* \* \*